(12) United States Patent
Langan

(10) Patent No.: US 7,149,358 B2
(45) Date of Patent: Dec. 12, 2006

(54) METHOD AND SYSTEM FOR IMPROVING CONTRAST USING MULTI-RESOLUTION CONTRAST BASED DYNAMIC RANGE MANAGEMENT

(75) Inventor: David A. Langan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 759 days.

(21) Appl. No.: 10/065,883

(22) Filed: Nov. 27, 2002

(65) Prior Publication Data

US 2004/0101207 A1    May 27, 2004

(51) Int. Cl.
    *G06K 9/74* (2006.01)
(52) U.S. Cl. .............. 382/214; 382/233; 382/235; 382/274; 382/275; 358/1.2; 358/3.26; 358/463
(58) Field of Classification Search ............... 382/214, 382/235, 243, 252, 274, 275, 233; 378/98, 378/98.7; 358/1.2, 3.26, 463
    See application file for complete search history.

(56) References Cited

U.S. PATENT DOCUMENTS

| 5,450,502 | A | * | 9/1995 | Eschbach et al. | ........... 382/169 |
| 5,633,511 | A | * | 5/1997 | Lee et al. | ........... 250/587 |
| 5,881,181 | A | * | 3/1999 | Ito | ........... 382/274 |
| 5,933,151 | A | * | 8/1999 | Jayant et al. | ........... 345/473 |
| 5,991,456 | A | * | 11/1999 | Rahman et al. | ........... 382/254 |
| 6,141,399 | A | * | 10/2000 | Tsujii | ........... 378/98.7 |
| 6,449,595 | B1 | * | 9/2002 | Arslan et al. | ........... 704/235 |
| 6,496,594 | B1 | * | 12/2002 | Prokoski | ........... 382/118 |
| 6,654,018 | B1 | * | 11/2003 | Cosatto et al. | ........... 345/473 |
| 6,711,302 | B1 | * | 3/2004 | Lee | ........... 382/275 |
| 6,834,125 | B1 | * | 12/2004 | Woodell et al. | ........... 382/274 |
| 2003/0031378 | A1 | | 2/2003 | Langan et al. | |

* cited by examiner

*Primary Examiner*—Samir Ahmed
*Assistant Examiner*—Yosef Kassa
(74) *Attorney, Agent, or Firm*—Fletcher Yoder

(57) ABSTRACT

A method, system and computer readable medium for implementing and performing a multi-resolution contrast-based dynamic range management algorithm and allowing for the efficient compression of an intensity dynamic range of an input image to a reduced intensity dynamic range of an image display signal. Specifically, the method, system and computer readable medium of the invention comprise decomposing the input image into a plurality of image components, modifying the intensity characteristics of the plurality of image components and reconstructing the plurality of image components into an output image for display on an image display device. In another aspect of the method, system and computer readable medium of the invention, the decomposition of the input image and reconstruction into an output image are performed using a Laplacian pyramid. In a further aspect of the method, system and computer readable medium of the invention, the intensity characteristics of each of the image components in the plurality are modified separately.

28 Claims, 5 Drawing Sheets

METHOD AND SYSTEM FOR IMPROVING CONTRAST USING MULTI-RESOLUTION CONTRAST BASED DYNAMIC RANGE MANAGEMENT

BACKGROUND OF THE INVENTION

The present invention is directed to multi-resolution contrast-based dynamic range management (MCDRM), and more particularly to a method, system and computer readable medium for implementing and performing a multi-resolution contrast-based dynamic range management algorithm.

Digital x-ray imaging is a well-known, non-contact technique for observing, in real time, interior aspects of an object. In practice, an x-ray beam is generated and targeted on an object of interest. A detecting device is positioned on the other side of the object and detects the x-rays transmitted through the object. The detected x-ray signals are converted to digital signals that represent various features in the object, are further processed, and the resulting signal is displayed on an image display device such as a CRT.

One of the fundamental image processing problems in digital x-ray imaging is the need to transform the intensity dynamic range of the input image to the dynamic range supported by an available display device. Typically, the intensity dynamic range of an image exceeds the dynamic range of the display mechanism by several times. The objective of the transformation accordingly is to compress the "DC" or mean component of the different regions comprising the image so that the dynamic range (typically 256 gray levels) of an available display device may be utilized in a fashion which maximizes the displayed image contrast taking into account, as well, the generally recognized limitation of the human eye of discerning only 256 gray levels.

Common approaches to achieving such transformations are known as "unsharp masking" and "extended dynamic range (EDR)", the latter a special adaptation of the former. The conventional approach to performing the EDR algorithm, in general, is simply to subtract a portion of the mean from the input signal. However, in some situations, this approach results in important contrast (higher frequency) information either being removed from the image or being artificially enhanced and thereby introducing artifacts. This and other conventional approaches to contrast suffer from image artifacts such as "blooming" and "halos." A blooming artifact is where the image is saturated at a maximum intensity and lacks texture. In the prior art, blooming artifacts can occur in lung regions and are mapped to 255 (in a 0–255 contrast scale) and appear white due to the inability to properly compress the region. Halos are visualized as bright highlighting about dark objects, such as a contrast filled vessel. Halos are a result of an inaccurate mean estimate coupled with the high pass nature of a dynamic range management computation.

Another problem with the current EDR processing algorithm is that of inconsistent contrast management resulting in exaggeration of negative contrast regions in the image. When a region in the image, such as a vessel filled with dye, for example, has an image intensity which is less than the surrounding local mean intensity value, EDR processing may exaggerate the negative contrast associated with the darker region when it subtracts the local mean intensity values from the intensity values associated with the darker region. This exaggerated negative contrast may result in artifacts, which can lead to misdiagnosis.

Where an image includes multiple areas having potentially differing mean levels of gray, or when images of objects embedded in such areas have respective, different gray levels, or if respective gray levels of an object and its background have similar values, the contrast parameters of the display window must be adjusted to enhance the visibility of these differences in order to obtain a diagnosis of the underlying structure being imaged. Thus, when a viewer's attention is shifted from one object to another, where the contrast of one combination of object and background differs significantly from the contrast of another combination of object and background, various display window parameters relating to contrast adjustment must be changed. Without such adjustments, the image will appear either excessively faint or excessively bright, such that all detail critical to an effective diagnosis is absent. As a result, in order to obtain a diagnosis, it is often necessary, during the course of shifting attention among areas of differing contrast, for the physician to make numerous contrast adjustments to the display window. This can be disruptive in, e.g., radiology and mammography procedures and is altogether unacceptable in cardiac procedures, underway at the time.

Contrast of a cardiac digital X-ray image must be managed in a deterministic and consistent manner to achieve optimum results. For example, cardiologists perform diagnoses by examining the apparent thickness of a coronary artery, as revealed in X-ray imaging by a contrast medium injection. Because of X-ray physics, the artery thickness may lead to a modulation of the underlying background gray-level, i.e., contrast. Contrast consistency, particularly in dye filled vessels, is important, since processing-induced contrast changes in vessels may be interpreted as coronary disease leading to misdiagnosis. Consequently, it is desirable that artery contrast (i.e., not intensity) pass through DRM processing with deterministic and linear gain. However, minimal and deterministic modification to contrast can be tolerated, particularly in X-ray imaging of the lungs, where there is significant compression of the mean and minimal clinically relevant information. In fluoroscopic mode, the cardiologist is focused on the placement of interventional devices, and the rendering of the corresponding contrast is more directed by the visibility of these tools. In prior systems, however, contrast functions were managed in a non-linear manner, which varied with the local mean—leading to artifacts and confusion and resulting, in at least some cases, in increased patient exposure in efforts to position the X-ray tube and an image intensifier such that a vasculature of interest, e.g., over a spine diagram, could be viewed satisfactorily.

Accordingly, it is desirable to provide a compression algorithm that overcomes the deficiencies of the aforementioned EDR processing algorithms and which permits managing the mean (low frequency) and contrast (high frequency) content of an image, separately and directly. Further, it is desirable to provide a compression algorithm that overcomes problems associated with inconsistent contrast management. Yet other limitations exist in even the more current EDR processing algorithm. For example, an X-ray imaging system is generally provided with controllable settings that allow the user to manually select one of three dynamic ranges. The EDR processor then subtracts a particular percentage of the local mean intensity value from the input image intensity value, based on the setting selected by the user. If the user fails to select the appropriate setting which best accommodates the dynamic range of a given image, the displayed image may have poor image quality. In many cases, this may result in the loss of more high frequency contrast information than is necessary to perform the compression.

It accordingly is desirable to provide a compression algorithm which adaptively adjusts to the dynamic range of the image, so that high frequency contrast information is preserved, while applying minimal compression to display the image in a more deterministic manner and with reduced complexity. It is also desirable that the method of dynamic range management avoid the introduction of image artifacts such as halos and blooming.

BRIEF SUMMARY OF THE INVENTION

A first preferred embodiment of the present invention is a method of compressing an intensity dynamic range of an input image to a reduced intensity dynamic range of an image display device comprising the steps of decomposing the input image into a plurality of image components, modifying the intensity characteristics of the plurality of image components and reconstructing the plurality of image components into an output image for display on an image display device. In another aspect of the invention, the decomposition of the input image and reconstruction into an output image are performed using a Laplacian pyramid. In a further aspect of the invention, the intensity characteristics of each of the image components in the plurality are modified separately.

A second preferred embodiment of the present invention is a system for compressing an intensity dynamic range of an input image to a reduced intensity dynamic range of an image display signal, the system comprising: an image detector and a computer coupled to the image detector. The computer is configured to: decompose the input image into a plurality of image components; modify the intensity characteristics of the plurality of image components; and reconstruct the plurality of image components into an output image for display on an image display device.

A third preferred embodiment of the present invention is a computer readable medium having program code recorded thereon for compressing an intensity dynamic range of an input image to a reduced intensity dynamic range of an image display signal, the computer readable medium controlling a computer to perform the method steps of decomposing the input image into a plurality of image components, modifying the intensity characteristics of the plurality of image components and reconstructing the plurality of image components into an output image for display on an image display device.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

The present invention provides a method, system and computer readable medium for implementing and performing a multi-resolution contrast-based dynamic range management algorithm for compressing an intensity dynamic range of an input image to a reduced intensity dynamic range of an image display device.

Preferred embodiments of the invention are now described in detail with reference to the above-mentioned figures.

Figure 1:
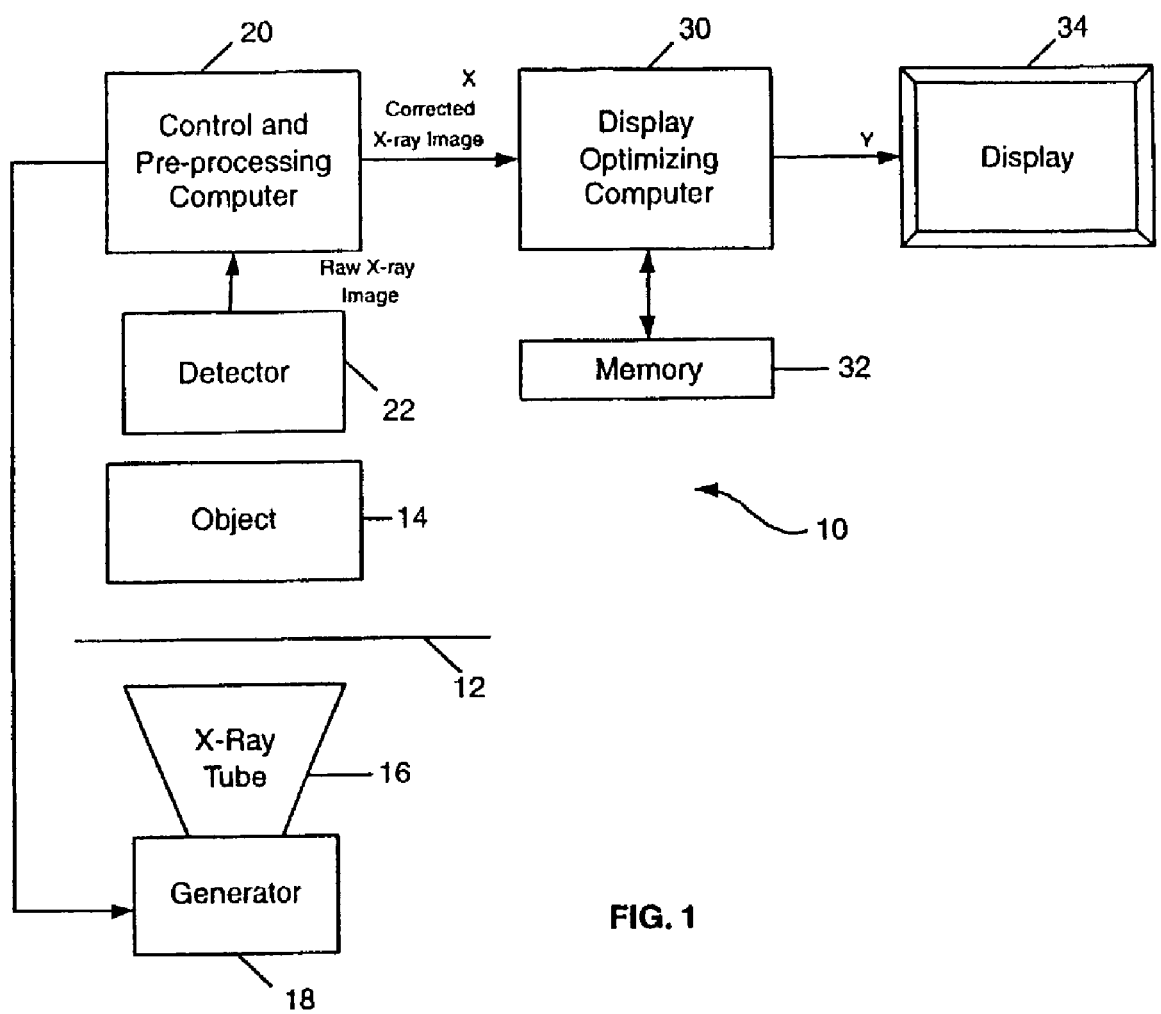
FIG. 1 is a diagram illustrating an x-ray imaging system for implementing and performing a MCDRM algorithm in accordance with the invention.

FIG. 1 is a schematic flow diagram of an x-ray imaging system 10 which can implement and perform the MCDRM processing algorithm of the invention. System 10 includes a table 12 on which an object 14 is placed prior to being imaged (e.g., a human body). Object 14 is irradiated by x-rays emitted by an x-ray tube 16, driven by a generator 18 under exposure management control by a control and preprocessing computer 20. X-rays passing through the object 14 are attenuated in differing amounts depending upon the character of the body portions, and conditions therein, of the object 14 being imaged. Thus, the variously attenuated x-rays impinge upon and are detected by an image detector 22, the image signal output of which is supplied to the control and preprocessing computer 20, all in conventional fashion. The image detector 22 may be a digital detector or an analog detector. In use, an analog detector is coupled with a pick up tube or CCD resulting in a digital imager. As is likewise conventional, the preprocessing computer 20 controls various functions of the x-ray imaging process including, e.g., offset, gain, bad pixel correction, exposure management (e.g., as to the x-ray tube 16 and generator 18) and scaling operations and, further, preprocesses the received x-ray image data so as to produce a corrected x-ray image data output X to a display optimizing computer 30.

A display-optimizing computer 30 includes a memory 32 for processing the image data X output by the preprocessing computer 20. Image data X is to be processed in accordance with the MCDRM algorithm of the invention by the computer 30 and, further, performs related display optimizing processing, such as spatial and temporal filtering, zoom, and display control functions, for producing an optimized output signal Y. Signal Y is supplied to, and displayed by, display unit 34. Computer 30 is programmed to perform functions described above and all exemplary embodiments described below, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Figure 2:
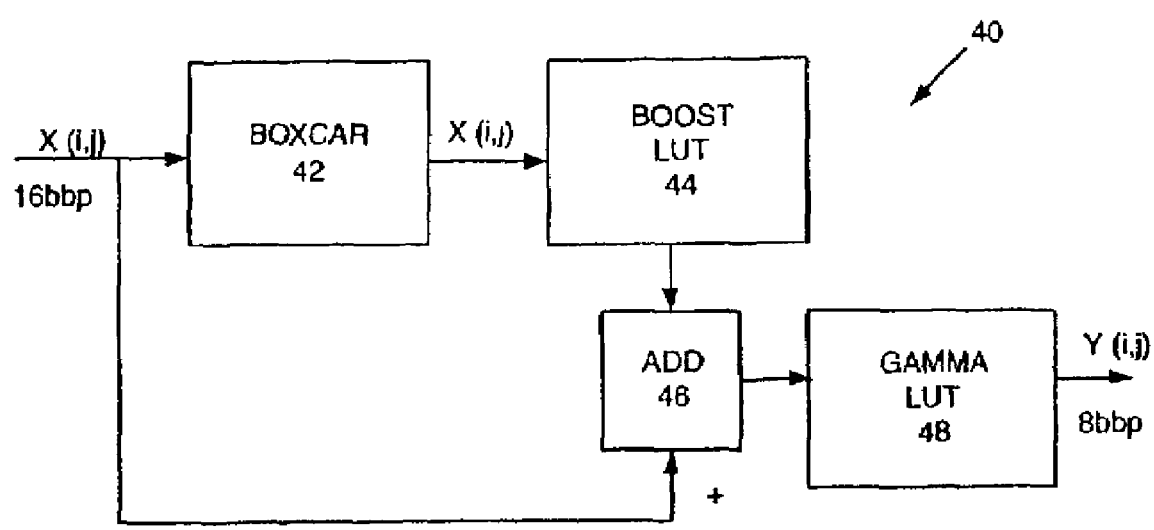
FIG. 2 is a flow diagram of an EDR algorithm processor of the prior art.

FIG. 2 is a flow diagram of an EDR algorithm processor 40 of the prior art. An EDR function is computed and implemented in the following manner:

$$Y(i,j) = \text{Gamma}[x(i,j) - \text{Boost}[\bar{x}(i,j)]] \quad (1)$$

where: y(i, j) is the (i, j)$^{th}$ pixel value of the output image, x(i, j) is the (i, j)$^{th}$ pixel value of the input image; and $\bar{x}$ (i, j), i.e., (x__bar(i,j)), is the local spatial mean intensity value of the (i, j)$^{th}$ pixel, derived from a moving-average algorithm such as a BOXCAR function 42.

In practice, the x-rays are converted to photons which, in turn, are converted to electrons in an x-ray imager. The electrons are then digitized by an analog-to-digital converter ("A/D" or "ADC") and basic image corrections are performed, such as adjustments to gain, offset and scaling, after which the image is ready to be processed for display.

The intensity value x of an input unit, such as a pixel, (i, j) of an image is first processed by a BOXCAR function 42 that determines the local mean intensity value of the desired unit at that (i, j) pixel location. (An "x" is used herein to designate an input intensity at a pixel location and, thus constitutes an individual scalar value; by contrast, an "X" designates the intensity image value, and thus is a vector value.) The BOXCAR function 42 utilizes a plurality of units, such as a neighborhood of pixels, which includes and is centered on the input pixel, to calculate the local spatial mean intensity value $\bar{x}$ (i,j)—(see, terms of Equation (1), supra).

As illustrated in FIG. 2, BOOST LUT 44 includes a look-up table (LUT) which specifies the intensity reduction of the input image signal x(i, j) as a function of the local spatial mean intensity value $\bar{x}$ (i, j). An adder (ADD) 46 combines the (negative) output of BOOST LUT 44 and the input image signal x(i, j) (see Equation (1)) and supplies the result to GAMMA LUT 48, which then compresses the result of the unsharp masking, or subtraction, operation of an ADD 46 to 256 levels (8 bits per pixel, or 8 bpp). The LUTs 44 and 48 are indexed by the appropriate pixel intensity values given in equation (1). Thus, each of the BOOST LUT 44 and the GAMMA LUT 48 jointly manage both mean and contrast modification functions.

Figure 3:
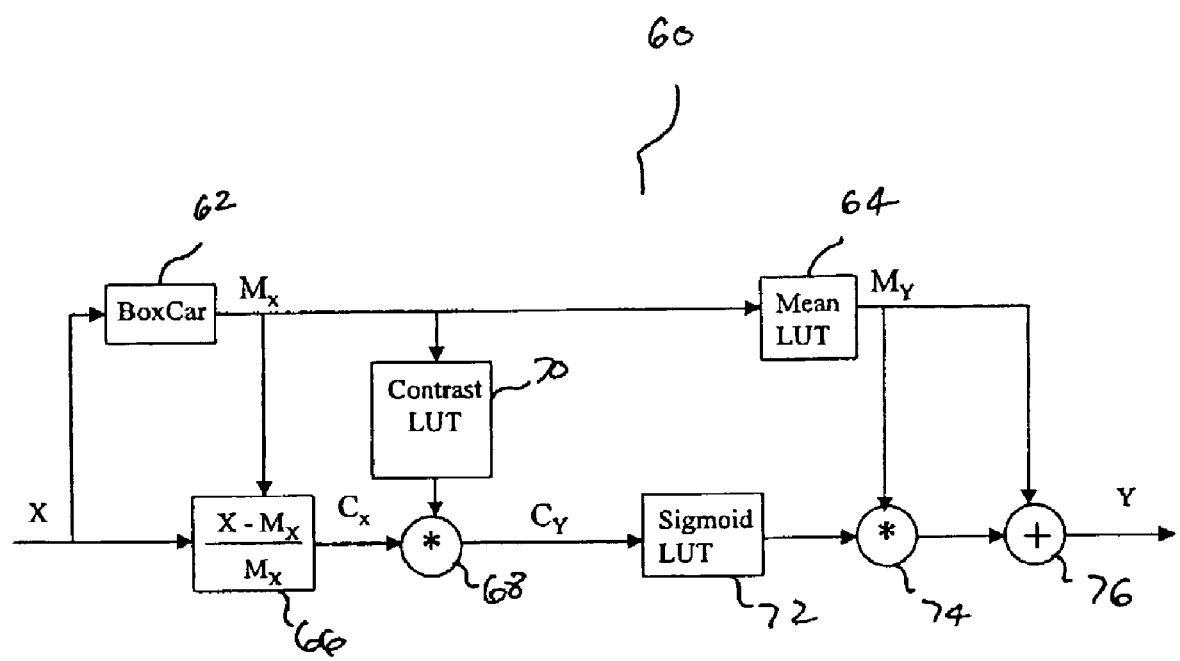
FIG. 3 is a flow diagram of a CDRM algorithm processor.

FIG. 3 illustrates a block diagram of a C-DRM processor 60 of the display-optimizing computer 12 of FIG. 1. Each block of the C-DRM processor 60 represents one or more functions, where:

X=input intensity value
$M_x$=local mean estimate
$C_x$=contrast estimate
$F_M($ )=mean modification function
$F_c($ )=contrast modification function
Y=C-DRM output intensity
$M_Y$=modified local mean
$C_Y$=modified contrast The C-DRM processor 60 computes Y as follows:

$$C_X = \frac{X - M_X}{M_X} \quad (2)$$

$$C_Y = C_X * f_C(M_X) \quad (3)$$

$$C'_Y = \text{Sigmoid}(C_Y) \quad (4)$$

$$M_Y = f_M(M_X) \quad (5)$$

$$C_Y = \frac{Y - M_Y}{M_Y} \quad (6)$$

$$Y = M_Y(C'_Y + 1) \quad (7)$$

In accordance with the implementation of the CDRM algorithm as shown in FIG. 3, an image is processed in accordance with equations (2–7) above. The input image is first processed by a BOXCAR function 62. The BOXCAR function 62 utilizes a neighborhood of pixels, typically next-adjacent to and including the input pixel being processed, to calculate the local mean estimate $M_x$. The BOXCAR function 62 acts as a low pass filter for separating structures of interest from variations in the detection output which are less relevant, e.g., gradually varying background. In experimental implementations, a 32×32 BOXCAR resulted in ringing (that is, an intensity oscillation) along contrast field vessels contrast filled vessels, heart to lung transition, heart to diaphragm, contrast filled catheter, etc. A 64×64 BOXCAR minimized that deficiency for cardiac applications by spanning a sufficient spatial area, or extent, such that contrast-liquid filled coronaries did not unduly influence the mean estimate of the background and sudden background changes, such as heart to lung, are more gradual.

An input intensity value X of a pixel in the input image is first processed by the BOXCAR function 62 to generate a local mean estimate $M_x$. The local mean estimate MX is then inputted to an arithmetic unit 66, which processes X in accordance with equation (2) above, and outputs the contrast estimate $C_x$ to a multiplier 68. A Contrast LUT 70 processes $M_x$ in accordance with the contrast modification function $F_c($ ) of equation (3) above and supplies the contrast gain, the output $f_c(M_x)$ thereof, to multiplier 68 which performs the multiplication function of equation (3) and produces the modified contrast $C_Y$ output to a Sigmoid LUT 72 in accordance with equation (4) above. The Sigmoid LUT 72 function is applied to the modified contrast $C_Y$ output and used to enable linear preservation of small inputs and non-linear and asymmetrical compression of large inputs. Alternatively, a mathematical function may be used to replace Sigmoid LUT 72. The use of the BOXCAR function for mean estimation and the Sigmoid LUT for tuning contrast may be applied separately or jointly and are not dependent on each other. In another embodiment, Sigmoid LUT 72 can be used with a BOXCAR function, a morphological filter, or any other mean estimator such as, but not limited to, a median filter.

Mean LUT function 64 processes the local mean estimate $M_x$ by the mean modification function $F_M($ ) of equation (5), above, to output the modified local mean $M_Y$. The mean modification function $F_M($ ) compresses the low frequency component of the input intensity X, directly and separately from (i.e., independently of) the contrast component. A component 74 multiplies the Sigmoid LUT 72 output and Mean LUT 64 output ($M_Y$) to generate a value which is then combined with Mean LUT 64 output ($M_Y$) in an adder 76, outputting the C-DRM output intensity Y to display 34, thereby to reproduce the image thereon in the reduced intensity dynamic range supported by display 34 as depicted in FIG. 1.

The inventor has determined that the use of the BOXCAR function in the CDRM algorithm as described above sometimes results in an incorrect estimation of the image background. For example, the image input to the BOXCAR function may contain the image of portions of a heart and a lung. These organs have very different intensity characteristics. If the BOXCAR function is centered about a point wherein the scope of the BOXCAR is evenly split between the two organs, then the mean estimate ($M_X$) generated is not particularly meaningful. Indeed, the background mean estimate will be in error whenever the spatial mean estimate operator (e.g., BOXCAR or otherwise) straddles regions of different intensities. Use of such a mean estimate coupled with the high-pass filter function of CDRM results in image artifacts such as ringing.

Another drawback of CDRM is the occurrence of blooming in the output image. This often occurs when imaging lungs. To maximize use of the 256 gray levels in the output image, the mean of the lungs is mapped to, for example, 245.

This leaves a relatively small range (246–255) for positive contrast in the lungs. The system needs to be symmetric for "small contrast," both positive and negative; otherwise, the visible appearance of the noise texture is changed in a manner the user/clinician finds disturbing. If too much compression is applied to the negative contrast range (e.g. 0–244), contouring will result. Using CDRM, the system cannot avoid blooming while, at the same time, manage the lungs in a small contrast range. CDRM with its single spatial operator, cannot by adjusted to address the enhancement of different size objects.

These problems are addressed using the MCDRM algorithm of the present invention. In the present invention, the above described CDRM algorithm and corresponding implementation are extended to a multi-resolution approach. The input image is decomposed into a plurality of components, the intensity characteristics of which are then modified. The plurality of image components are then reconstructed into an output image for display on an image display device. In the preferred embodiment of the invention, the decomposing of the input image and reconstructing into an output image is performed using a Laplacian pyramid and the intensity characteristics of each of the image components in the plurality are modified separately. However, one skilled in the art would recognize that the scope of the present invention is not limited to the specific embodiment including a Laplacian pyramid and that other mathematical constructs may be used to decompose an image into a plurality of components to allow modification of the individual components and subsequent reconstruction of the plurality of components into an output image.

Decomposing the image into a plurality of components and allowing for the fine tuning of the image characteristic of each of those components avoids the above described problems relating to ringing and blooming in the output image.

Figure 4:
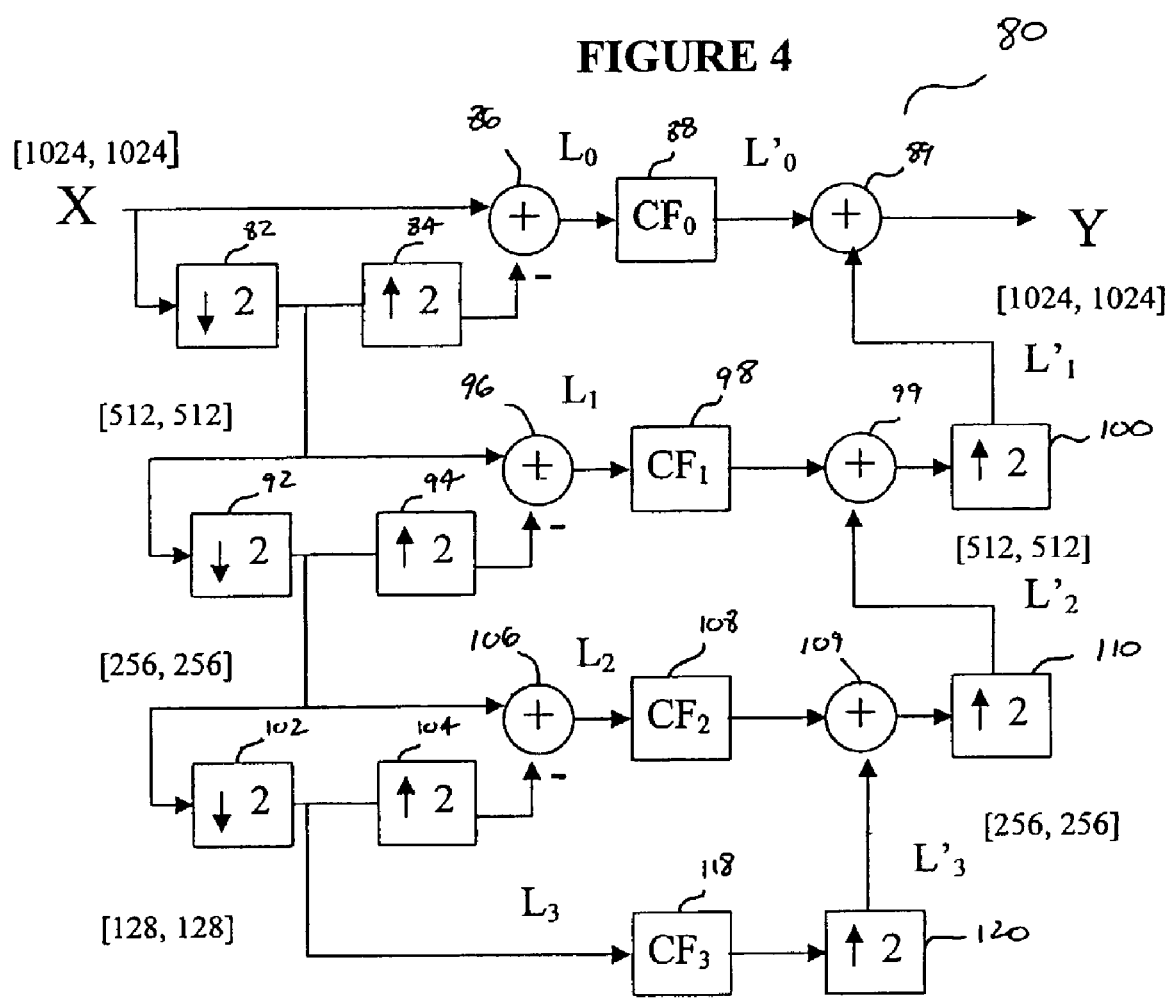
FIG. 4 is a flow diagram illustrating a Laplacian pyramid decomposition and inverse transformation (reconstruction) of an image as part of the MCDRM algorithm of the present invention.

FIG. 4 illustrates a four-level Laplacian pyramid 80 as an example of a construct which may be used to implement the MCDRM algorithm of the present invention. The number of levels of the pyramid, N, is determined based upon the maximum size of the object of interest. For vascular applications, four or five levels have been found to be appropriate. The larger the size of the object of interest, the more levels that should be used.

The computer 30 is programmed to implement the MCDRM algorithm and calculate the output image Y in accordance with the flow diagram illustrated in FIG. 4. The numbers in brackets at each of the levels represents the size of the image in pixels according to an example in which the input image X has a size of 1024×1024 pixels. As shown in FIG. 4, the corresponding output image Y also has a size of 1024×1024 pixels. The input image X is reduced by decimator 82. The decimators in this figure reduce the size of the input image by a predetermined factor which, in this example, is two. Accordingly, the size of the image output from the decimator 82 is 512×512 pixels. This reduction can be accomplished by any know means, including the periodic removal of pixels or the averaging of a number of pixels to a smaller number. Local averaging of pixels is the preferred method of reduction.

The reduced image is then input to an interpolator 84 which expands the size of the image. The interpolators in this figure expand the size of the input image by a predetermined factor which, in this example, is two. Accordingly, the size of the image output from the interpolator 84 is 1024×1024 pixels. Any known method of interpolation can be used to expand the size of the input image to interpolator 84. Even though they are the same size, this image will appear more blurry than the input image X since some image data has been removed. The effect is that of low-pass filtering of the input image X. The output of the interpolator 84 is subtracted from the input image X in element 86. The difference between these two signals is output from element 86 is labeled L0 in the figure.

Similar operations occur at lower levels of the pyramid. For example, the output of the decimator 82, which is an image of size 512×512 pixels, is the input image to decimator 92. The output of decimator 82, which is an image of size 256×256 pixels, is input to interpolator 94 and to decimator 102 at the next level of the pyramid 80. The output of interpolator 94 is subtracted, at element 96, from the output of decimator 82 to create a difference signal L1. Similar operations are performed at subsequent levels of the pyramid 80 at decimator 102, interpolator 104 and element 106.

At the last (lowest) level of the pyramid 80, no further decimations or interpolations are performed. The resulting signal L3 represents what remains of the original input image X after having been decimated by a factor of two at three levels, resulting in an image of size 128×128 pixels.

Figure 5:
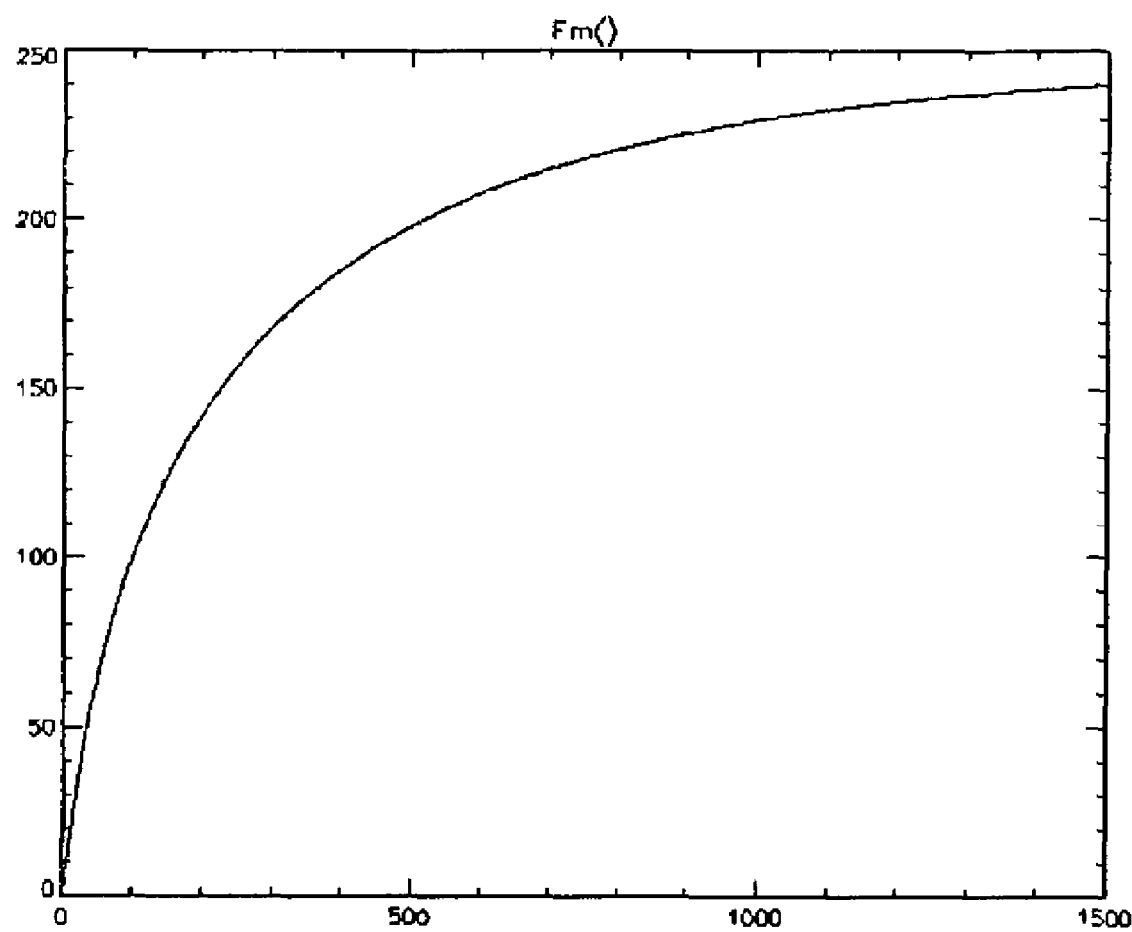
FIG. 5 is a graph illustrating a mean modification function under the present invention.

Each of the plurality of image components, represented by the difference signals $L_0$–$L_3$, are then modified based upon a corresponding contrast function ($CF_0$–$CF_3$) represented respectively by elements 88, 98, 108 and 118. The contrast function for the lowest level of the pyramid 80, in this case $CF_3$, corresponds to the mean modification function $F_M(\ )$ used in the CDRM algorithm described above. This function is linear in the low intensity region and logarithmically shaped in the medium and high intensity regions. An example of such a mean modification function $F_M(\ )$ is shown in FIG. 5. The range of intensities of the input image is displayed along the x-axis while the range of intensities of the output image is displayed along the y-axis. The graph shows the mapping that occurs from the input intensities (large range) to the output intensities (smaller range). As mentioned above, this may be accomplished using a look up table or may be calculated in real time.

For the levels above the lowest level of the pyramid 80, the contrast functions ($CF_0$, $CF_1$ . . . , $CF_{N-1}$) perform the functions of the contrast LUT 70 and the sigmoid LUT 72 in the CDRM algorithm. One of the additional benefits is that the individual difference bands ($L_0$, $L_1$ . . . $L_{N-1}$) can be adjusted independently. The equation representing the contrast function at these levels of the pyramid can be expressed as follows:

$$CF_M = G_M * (L'_N/L_N) * S\_LUT(L_N, L_M) \quad (8)$$

In equation (8), M is the level number ranging from 0 to N−1. $G_M$ represents a level gain. The term $L'_N/L_N$ is a scaling function based on the mean modification function $F_M(\ )$. It does not change from level to level and, in essence, represents a scaling function which takes into account the range of intensities of both the input difference signal ($L_N$) to the lowest contrast function and the corresponding interpolated output difference signal ($L'_N$). The value of $L_N$ is provided to the individual contrast functions by the processor. For the sake of simplicity, this feedback is not drawin in FIG. 4. The effect of function $S\_LUT(L_N, L_M)$ on the input signal depends on both LN and on the input signal ($L_M$) itself. The S_LUT function serves to allow small differences to pass linearly (with little change) and large differences to pass logarithmically (i.e with compression). In effect, the S_LUT function combines the effect of the contrast LUT 70 and the sigmoid LUT 72 in the CDRM algorithm. As with the look up tables discussed above, modification of the intensities of the input signal to the S_LUT function may be accomplished using a look up table or may be calculated in real time on the basis of the data itself.

Turning to the example in FIG. 4, the difference signal $L_3$ is input to the contrast function ($CF_3$) 118. The output signal is then expanded by interpolator 120 to a size of 256×256 pixels. This expanded signal is labeled $L'_3$ in the figure. Meanwhile, the next higher level in the pyramid, the difference signal $L_2$ is input to the contrast function ($CF_2$) 108. The output signal is then combined with the signal $L'_3$ in element 109 and is then expanded by interpolator 110 to a size of 512×512 pixels.

Similar operation occur in the progressively higher levels of the pyramid 80 at contrast functions 88 and 98, interpolator 100 and elements 89 and 99. The output of element 89 represents the output image Y.

The latency from the time an event occurs to the time the event is displayed in the output image is important to the user/clinician. For example, if the clinician is navigating a catheter and monitoring its movement in the output image, it is necessary that the latency be very low in order to facilitate proper hand-eye coordination. In general, approximately 150 ms is the maximum overall system latency that may be tolerated. This requirement serves to limit the complexity and amount of data flow in the DRM systems. To meet these latency requirements, in the present invention, the steps of FIG. 4 are performed in parallel. Furthermore, the processing does not wait for entire images to be treated. For example, as each line of the image X is reduced in decimator 82, it is then input to the decimator 92. This is as opposed to the entire image X being decimated and then input to the next-level decimator. Generally, as each pixel is treated by an element in FIG. 4, it is then input to the next downstream element.

The iterative nature of the Laplacian pyramid in the MCDRM algorithm offers significant advantages over the CDRM system, both in computational complexity and efficiency. It will be apparent to those skilled in the art that the size (number of levels) of the pyramid can be adjusted without departing from the scope of the present invention. The plurality of components into which the input image is decomposed represent the differences ($L_0$, $L_1$ . . . $L_N$) between the low-pass images at successive levels of the pyramid. The plurality of contrast functions can be different from each and customized based upon the object of interest. Prior knowledge of the intensity characteristics representing an object of interest can be incorporated into the system.

Thus, a method, a system and a computer readable medium for implementing and performing a multi-resolution contrast-based dynamic range management algorithm have been described according to the present invention. Many modifications and variations may be made to the techniques described and illustrated herein without departing from the spirit and scope of the invention. For example, the above-described Gaussian weighted mean computation used in the Laplacian Pyramid could be replaced by an unweighted mean over a local rectangular region. This unweighted mean may be calculated with constant computational complexity for arbitrary spatial extent. Hence the decimation and interpolation, used to reduce computation complexity for the Gaussian weighted mean are unnecessary. The image components of Laplacian Pyramid, based upon the unweighted mean, would be acted upon in the same manner as described above with respect to the preferred embodiment of the invention.

Accordingly, it should be understood that the methods and systems described herein are illustrative only and are not limiting upon the scope of the invention.

The present invention is in the same field of technology as two other commonly owned applications, U.S. patent application Ser. No. 09/522,384 filed on Mar. 10, 2000 and U.S. patent application Ser. No. 09/682,235 filed on Aug. 8, 2001, the entire contents of both applications being incorporated herein by reference.

What is claimed is:

1. A method of compressing an intensity dynamic range of an input image to a reduced intensity dynamic range of an image display signal, said method comprising:
   a) decomposing the input image into a plurality of image components;
   b) modifying the intensity characteristics of the plurality of image components, wherein said modifying the intensity characteristics further comprises subjecting each of said plurality of image components to a separate one of a plurality of contrast functions to modify the intensity characteristics of each of said plurality of image components, wherein at least one of said plurality of contrast functions is different from other contrast functions in said plurality; and
   c) reconstructing the plurality of image components into an output image for display on an image display device.

2. A method according to claim 1 wherein in step b), the intensity characteristics of each of said plurality of image components is modified separately.

3. A method according to claim 1 wherein in step b), the modification of the intensity characteristics of said plurality of image components comprises mapping a plurality of intensities of an image component to a smaller plurality of intensities for said image component.

4. A method according to claim 3 wherein said mapping is performed using a look-up table.

5. A method according to claim 3 wherein said mapping is performed by calculating an intensity range for the image component based upon actual intensities of pixels within the image component.

6. A method according to claim 1 wherein the decomposing of step a) and the reconstructing of step c) are performed using a Laplacian pyramid.

7. A method according to claim 6 wherein said at least one contrast function is represented by the equation $$CFM = GM*(L'N/LN)*S\_LUT(LN, LM)$$

where N is lowest level number of the Laplacian pyramid, M is a level number of the Laplacian pyramid other than N, CFM is the contrast function, GM is a level gain, (L'N/LN) is a scaling function, LN is an input intensity signal for the N-th level in the Laplacian pyramid, L'N is an output intensity signal for the N-th level in the Laplacian pyramid, LM is an input difference signal for the M-th level in the Laplacian pyramid and S_LUT(LN, LM) is a transfer function depending on LN and LM.

8. A method according to claim 1 wherein step a) further comprises:
   decimating said input image into a plurality of reduced images of successively smaller size;
   interpolating said plurality of reduced images into a plurality of expanded images; and
   generating at least one of said plurality of image components by subtracting one of said plurality of expanded images of a given size from one of said plurality of reduced images of said given size.

9. A method according to claim 1 wherein step c) further comprises combining said image components output from said plurality of contrast functions such that an image component having a smaller size is expanded to have a larger size before its combination with an image component having said larger size.

10. A system for compressing an intensity dynamic range of an input image to a reduced intensity dynamic range of an image display signal, said system comprising:
   an image detector; and
   a computer coupled to said image detector and configured to;
   decompose the input image into a plurality of image components;
   modify the intensity characteristics of the plurality of image components; and
   reconstruct the plurality of image components into an output image for display on an image display device, wherein said computer is further configured to combine said image components output from a plurality of contrast functions such that an image component having a smaller size is expanded to have a larger size before its combination with an image component having said larger size.

11. A system according to claim 10 wherein said computer is further configured to separately modify the intensity characteristics of each of said plurality of image components.

12. A system according to claim 10 wherein said computer is further configured to modify the intensity characteristics of said plurality of image components by mapping a plurality of intensities of an image component to a smaller plurality of intensities for said image component.

13. A system according to claim 12 wherein said computer is further configured to perform said mapping using a look-up table.

14. A system according to claim 12 wherein said computer is further configured to perform said mapping by calculating an intensity range for the image component based upon actual intensities of pixels within the image component.

15. A system according to claim 10 wherein said computer is further configured to perform said decomposing step and said reconstructing step using a Laplacian pyramid.

16. A system according to claim 15 wherein said at least one contrast function is represented by the equation $$CFM = GM * (L'N/LN) * S\_LUT(LN, LM)$$

where N is lowest level number of the Laplacian pyramid, M is a level number of the Laplacian pyramid other than N, CFM is the contrast function, GM is a level gain, (L'N/LN) is a scaling function, LN is an input intensity signal for the N-th level in the Laplacian pyramid, L'N is an output intensity signal for the N-th level in the Laplacian pyramid, LM is an input difference signal for the M-th level in the Laplacian pyramid and S_LUT(LN, LM) is a transfer function depending on LN and LM.

17. A system according to claim 10 wherein said computer is further configured to:
   decimate said input image into a plurality of reduced images of successively smaller size;
   interpolate said plurality of reduced images into a plurality of expanded images; and
   generate at least one of said plurality of image components by subtracting one of said plurality of expanded images of a given size from one of said plurality of reduced images of said given size.

18. A system according to claim 10 wherein said computer is further configured to subject each of said plurality of image components to a separate one of said plurality of contrast functions to modify the intensity characteristics of each of said plurality of image components, wherein at least one of said plurality of contrast functions is different from other contrast functions in said plurality.

19. A computer readable medium having program code recorded thereon for compressing an intensity dynamic range of an input image to a reduced intensity dynamic range of an image display signal, said computer readable medium controlling a computer to perform the following method steps:
   a) decomposing the input image into a plurality of image components;
   b) modifying the intensity characteristics of the plurality of image components; and
   c) reconstructing the plurality of image components into an output image for display on an image display device, wherein step a) further comprises generating at least one of said plurality of image components by subtracting one of a plurality of expanded images of a given size from one of a plurality of reduced images of said given size.

20. A computer readable medium according to claim 19 wherein in step b), the intensity characteristics of each of said plurality of image components is modified separately.

21. A computer readable medium according to claim 19 wherein in step b), the modification of the intensity characteristics of said plurality of image components comprises mapping a plurality of intensities of an image component to a smaller plurality of intensities for said image component.

22. A computer readable medium according to claim 21 wherein said mapping is performed using a look-up table.

23. A computer readable medium according to claim 21 wherein said mapping is performed by calculating an intensity range for the image component based upon actual intensities of pixels within the image component.

24. A computer readable medium according to claim 19 wherein the decomposing of step a) and the reconstructing of step c) are performed using a Laplacian pyramid.

25. A computer readable medium according to claim 19 wherein step a) further comprises:
   decimating said input image into the plurality of reduced images of successively smaller size; and
   interpolating said plurality of reduced images into the plurality of expanded images.

26. A computer readable medium according to claim 19 wherein step b) further comprises subjecting each of said plurality of image components to a separate one of a plurality of contrast functions to modify the intensity characteristics of each of said plurality of image components, wherein at least one of said plurality of contrast functions is different from other contrast functions in said plurality.

27. A computer readable medium according to claim 26 wherein said at least one contrast function is represented by the equation $$CFM = GM * (L'N/LN) * S\_LUT(LN, LM)$$

where N is lowest level number of a Laplacian pyramid, M is a level number of the Laplacian pyramid other than N, CFM is the contrast function, GM is a level gain, (L'N/LN) is a scaling function, LN is an input intensity signal for the N-th level in the Laplacian pyramid, L'N is an output intensity signal for the N-th level in the Laplacian pyramid, LM is an input difference signal for the M-th level in the Laplacian pyramid and S_LUT(LN, LM) is a transfer function depending on LN and LM.

28. A computer readable medium according to claim 27 wherein step c) further comprises combining said image components output from said plurality of contrast functions such that an image component having a smaller size is expanded to have a larger size before its combination with an image component having said larger size.

* * * * *